(12) United States Patent
Evans

(10) Patent No.: US 6,512,205 B1
(45) Date of Patent: Jan. 28, 2003

(54) GETTERING SYSTEM FOR BRAZING HEAT EXCHANGERS IN CAB FURNACE

(75) Inventor: Timothy Van Evans, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/573,427

(22) Filed: May 16, 2000

(51) Int. Cl.[7] ............................. F27B 9/10; F27B 5/16; F27B 5/04; F27D 7/06; B01D 53/04
(52) U.S. Cl. .................... 219/388; 219/85.17; 219/400; 228/217
(58) Field of Search ............................... 219/388, 85.1, 219/391, 400, 85.17, 85.22; 228/183, 217, 219, 262.51; 373/110

(56) References Cited

U.S. PATENT DOCUMENTS

| | | | |
|---|---|---|---|
| 3,370,343 A | 2/1968 | Martin | |
| 3,373,483 A | 3/1968 | Miller | |
| 3,378,914 A | 4/1968 | Miller | |
| 3,966,433 A | * 6/1976 | Molitor | ........................ 95/116 |
| 3,973,718 A | 8/1976 | Deschamps | |
| 3,981,699 A | * 9/1976 | Molitor | ........................ 96/127 |
| 4,118,542 A | * 10/1978 | Walter | ........................ 228/217 |
| 4,173,302 A | 11/1979 | Schultze et al. | |
| 4,240,574 A | 12/1980 | Schmatz et al. | |
| 4,357,397 A | 11/1982 | Baba et al. | |
| 4,401,254 A | 8/1983 | Tramontini | |
| 4,466,567 A | 8/1984 | Garrison | |
| 4,626,295 A | 12/1986 | Sasaki et al. | |
| 4,721,653 A | 1/1988 | Oda et al. | |
| 4,758,273 A | 7/1988 | Gilman et al. | |
| 4,785,092 A | 11/1988 | Nanba et al. | |
| 4,997,124 A | * 3/1991 | Kitabatake et al. | ......... 228/217 |
| 5,069,980 A | 12/1991 | Namba et al. | |
| 5,125,452 A | 6/1992 | Yamauchi et al. | |
| 5,148,862 A | 9/1992 | Hashiura et al. | |
| 5,171,377 A | 12/1992 | Shimizu et al. | |
| 5,180,098 A | 1/1993 | Halstead et al. | |
| 5,232,521 A | 8/1993 | Takahashi et al. | |
| 5,350,436 A | 9/1994 | Takezoe et al. | |
| 5,422,191 A | 6/1995 | Childree | |
| 5,423,122 A | * 6/1995 | Boltz et al. | ............ 29/890.054 |
| 5,679,270 A | * 10/1997 | Thornton et al. | ............ 216/101 |
| 5,762,132 A | * 6/1998 | Evans et al. | ................ 228/183 |
| 5,826,780 A | * 10/1998 | Neeser et al. | ................ 228/217 |
| 6,076,727 A | * 6/2000 | Evans et al. | ................ 228/183 |

* cited by examiner

Primary Examiner—Joseph Pelham
(74) Attorney, Agent, or Firm—Scott M. Confer

(57) ABSTRACT

A gettering system for a CAB furnace includes a nitrogen gas source to supply a nitrogen gas to a controlled atmosphere brazing (CAB) furnace and an active metal getter source disposed within the CAB furnace and being a sheet to remove oxygen and water vapor in the nitrogen gas, whereby heat exchangers are brazed during a controlled atmosphere brazing (CAB) process in the CAB furnace.

12 Claims, 3 Drawing Sheets

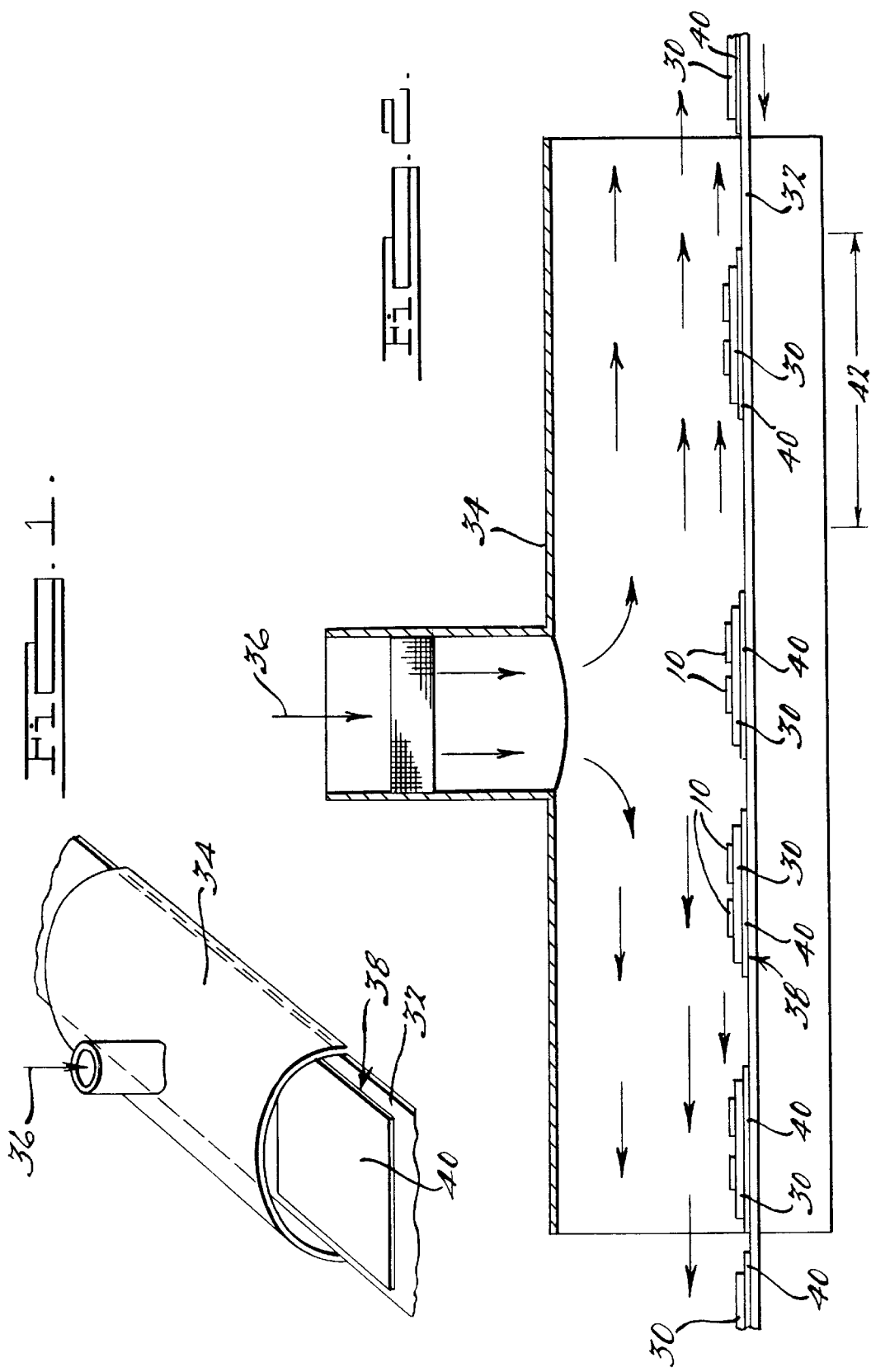

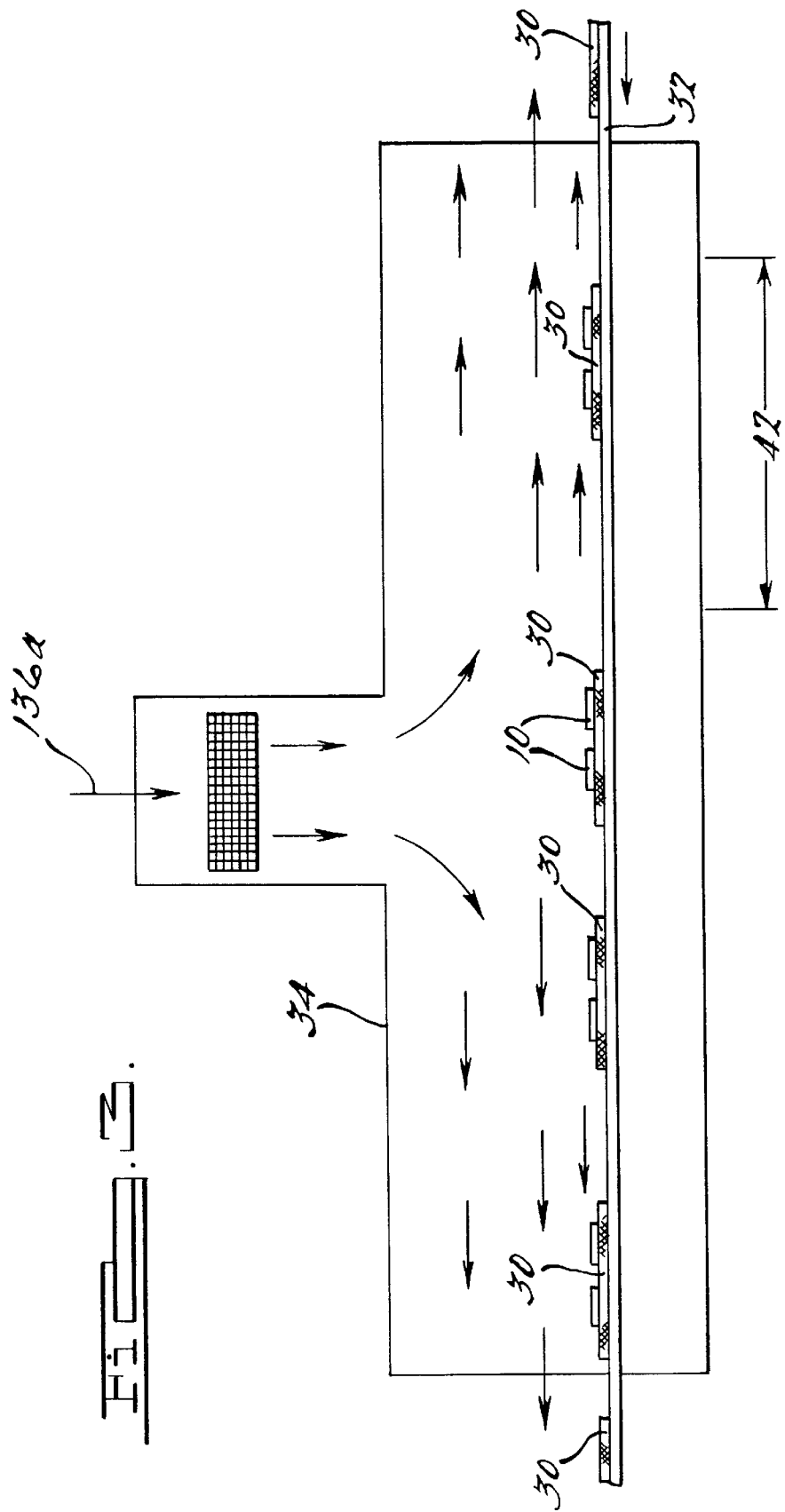

GETTERING SYSTEM FOR BRAZING HEAT EXCHANGERS IN CAB FURNACE

BACKGROUND OF THE INVENTION

1. Field of the Invention

The present invention relates generally to heat exchangers and, more specifically, to a gettering system for brazing heat exchangers used in automotive vehicles in a controlled atmosphere brazing (CAB) furnace.

2. Description of the Related Art

It is known to provide automotive vehicles with heat exchangers such as condensers, evaporators, heater cores and coolers. These heat exchangers are alternating rows of tubes or plates with convoluted fins made of a metal material such as aluminum or an aluminum alloy. Previously, the heat exchangers have been brazed in a vacuum furnace. Recently, a process known as "controlled atmosphere brazing (CAB)" has been used with non-corrosive fluxes. The CAB process has been preferred over vacuum furnace brazing due to improved production yields, lower furnace maintenance requirements and greater braze process robustness.

It is also known for CAB furnace brazing that an inert gas such as nitrogen gas is used to provide a non-oxidizing atmosphere. Although considered to be non-oxidizing, nitrogen gas contains residual impurities, most notably oxygen and water vapor. Although the aluminum heat exchanger is pre-cleaned using alkaline cleaning agents that reduce the native aluminum oxide layer, the surface of the aluminum heat exchanger will re-oxidize in the CAB furnace due to the presence of the oxygen and water vapor in the nitrogen gas. To minimize re-oxidation of the aluminum heat exchanger during the brazing process, the oxygen and water vapor in the nitrogen gas may be purified to less than twenty parts per million (20 ppm).

Although CAB furnace brazing has worked well, it is desirable to provide a gettering system for brazing heat exchangers in a CAB furnace. Also, it is desirable to reduce the oxygen content in incoming nitrogen used during CAB furnace brazing. Further, it is desirable to provide CAB furnace brazing with cost effective for use in high volume processing of aluminum heat exchangers.

SUMMARY OF THE INVENTION

Accordingly, the present invention is a gettering system for a CAB furnace includes a nitrogen gas source to supply a nitrogen gas to a controlled atmosphere brazing (CAB) furnace and an active metal getter source disposed within the CAB furnace and being a sheet to remove oxygen and water vapor in the nitrogen gas, whereby heat exchangers are brazed during a controlled atmosphere brazing (CAB) process in the CAB furnace.

One advantage of the present invention is that a gettering system is provided for brazing heat exchangers in a CAB furnace. Another advantage of the present invention is that the gettering system uses an active metal getter source to remove residual gas impurities, namely oxygen and water vapor from inert gases to levels below 20 ppm for fluxless CAB furnace brazing of the aluminum heat exchanger assembly. Yet another advantage of the present invention is that the gettering system that reduces oxygen level in incoming nitrogen by as much as twenty-nine percent, leading to an ultra-purified braze atmosphere that allows for brazing of fluxless alloy compositions. Still a further advantage of the present invention is that the use of the active metal getter source allows fluxless CAB furnace brazing of evaporators, condensers, heater cores and radiators. A further advantage of the present invention is that the gettering system is compatible with current CAB furnace designs and could be incorporated directly into existing furnace muffles with similar effects.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a partial perspective view of a gettering system, according to the present invention, for brazing heat exchangers.

FIG. 2 is a fragmentary elevational view of the gettering system of FIG. 1.

FIG. 3 is a fragmentary elevational view of another embodiment, according to the present invention, of the gettering system of FIG. 1.

DESCRIPTION OF THE PREFERRED EMBODIMENT(S)

Figure 4:
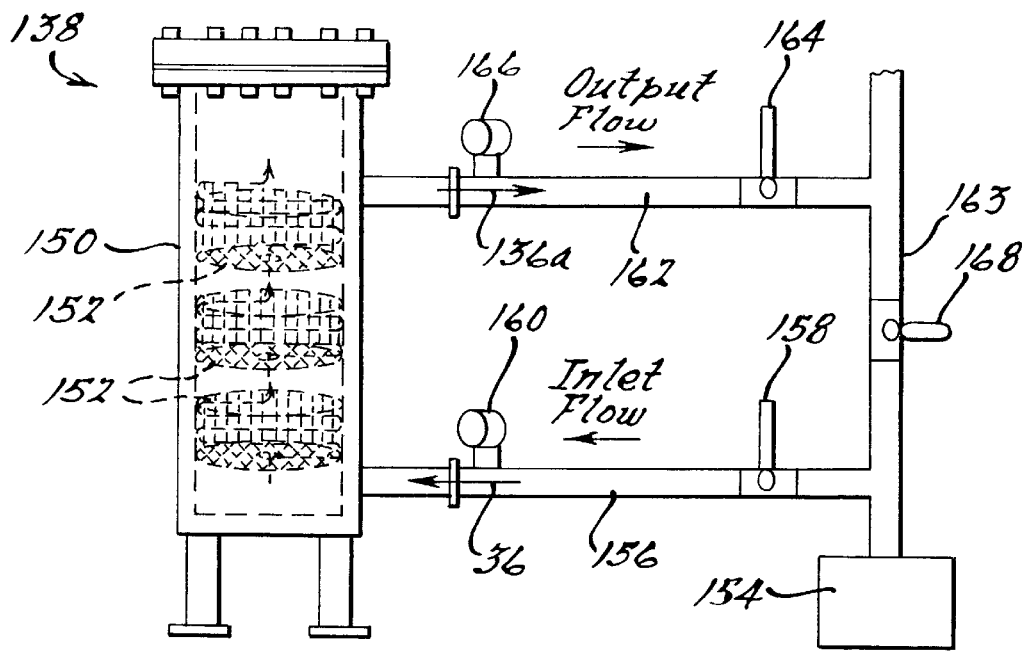
FIG. 4 is a fragmentary view of a portion of the gettering system of FIG. 3.

Referring to FIGS. 1 and 2, one embodiment of a heat exchanger assembly 10, according to the present invention, is shown. In this example, the heat exchanger assembly 10 is a condenser for an air conditioning system (not shown) of a vehicle such as an automotive vehicle (not shown). The heat exchanger assembly 10 includes at least one, preferably a plurality of tubes (not shown) made of a core material having a composition cladding thereon. The composition cladding contains lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to 0.1%, zinc (Zn) within a range from about 0% to about 0.3%, beryllium (Be) within a range from about 0.01% to about 0.7%, impurities not exceeding a total of 1%, balance aluminum. The core material is made of an aluminum based material selected from the Aluminum Association 1XXX, 3XXX, 5XXX and 6XXX series aluminum alloys. The heat exchanger assembly 10 includes at least one component (not shown) disposed adjacent the composition cladding. For example, the component may be a turbulator disposed within the tube or a fin disposed outside on the tube and made of an aluminum based material of the Aluminum Association 3XXX series aluminum alloys. It should be appreciated that the heat exchanger assembly 10 may be a parallel flow condenser, serpentine evaporator, heater core, or transmission oil cooler.

The heat exchanger assembly 10 is assembled using a CAB furnace brazing process. During the brazing process, the Cs—Li—Mg content in the composition cladding liquefies at or about 550° C. and flows through a porous aluminum oxide ($Al_2O_3$) layer on an external surface thereof to wet the external surface. This wetting provides the medium to continue the dispersement of the oxide layer and allows the composition cladding to flow into a joint therebetween and create a braze. It should be appreciated that the CAB furnace brazing process is conventional and known in the art. It should also be appreciated that plates and manifolds (not shown) may have the composition cladding to allow fluxless brazing for evaporators.

In the CAB process, the heat exchanger assembly 10 is placed on a braze holding furnace fixture 30 and preheated, for example, to a temperature in a range from about 425° F. to about 475° F. (224° C.–246° C.). The heat exchanger assembly 10 and braze holding furnace fixture 30 are transferred to a prebraze chamber where it is soaked for about 3–15 minutes at about 750° F. (399° C.). Subsequently, the hot heat exchanger assembly 10 and braze holding furnace fixture 30 are transferred to a conveyor 32 and moved through a CAB furnace 34 which is purged by applying a nitrogen gas at 36 inside the CAB furnace 34.

As illustrated in FIGS. 1 and 2, a gettering system, generally indicated at 38, is provided for the CAB furnace 34 to remove residual oxygen and water vapor in the nitrogen gas 36. The gettering system 38 includes an active metal getter source 40 in the CAB furnace 34. The active metal getter source 40 is in the form of a sheet having a generally rectangular shape and is located between the braze holding furnace fixture 30 and the conveyor 32. The active metal getter source 40 may be Titanium, Titanium-alloys, Zirconium and Zirconium alloys. For example, the active metal getter source 40 may be zirconium iron (ZrFe), zirconium nickel (ZrNi) or Titanium Molybdenum (TiMo) used in combination with composition cladding to getter residual oxygen and water vapor from the nitrogen gas to less than twenty parts per million (20 ppm). The Ti getter source is Ti one hundred weight percent (100 wt %) and the TiMo getter source is Ti eighty-five weight percent (85 wt %)/Mo fifteen weight percent (15 wt %). The Zr getter source is Zr one hundred weight percent (100 wt %) and ZrFe getter source is Zr seventy to eighty weight percent (70–80 wt %)/Fe twenty to thirty weight percent (20–30 wt %) and ZrNi getter source is Zr seventy to eighty weight percent (70–80 wt %)/Ni twenty to thirty weight percent (20–30 wt %). The ZrFe, ZrNi and TiMo getter source are most efficient in removing residual water vapor and oxygen in the temperature range from about 400C to about 600° C., which is within the temperature range of the CAB furnace. In the CAB furnace 34, the heat exchanger assembly 10 is kept for 2–3 minutes at about 1095° F.–1130° F. (591° C.–610° C.). The movement of the conveyor 32 provides a scrubbing action relative to the gettering source 40, which provides a mechanism for continuous oxide removal from the heat exchanger assembly 10 without using a cleaning process. The brazed heat exchanger assembly 10 is then cooled, removed and applied for its intended use. It should be appreciated that the CAB furnace 34 has a hot zone 42 from is about 595° C. to about 605° C.

Referring to FIGS. 3 and 4, another embodiment 138, according to the present invention, of the gettering system 38 is provided for the CAB furnace 34 to remove residual oxygen and water vapor in the nitrogen gas 36. Like parts of the gettering system 38 have like reference numerals increased by one hundred (100). In this embodiment, the gettering system 138 is a secondary gas purification system. The gettering system 138 includes a plenum 150 having at least one, preferably a plurality of baskets 152 disposed therein. The baskets 152 are stacked radially in the plenum 150. The baskets 152 may be made from a honeycomb shaped material or a rolled sheet. Each of the baskets 152 contains an active metal getter source 140. The active metal getter source 140 is in the form of a plurality of pellets made from grit blasted titanium, molybdenum, or tantalum that react with the incoming oxygen to create an oxide layer on the pellet surface, thus reducing the oxygen level in the incoming nitrogen gas 36. It should be appreciated that the baskets 152 are removable from the plenum 150.

The gettering system 138 includes a tank 154 for holding the incoming nitrogen gas 36 and an incoming fluid line 156 interconnecting the tank 154 and plenum 150 near a bottom thereof. The incoming fluid line 156 may include a valve 158 and at least one pressure indicator and/or sampling port 160 for regulating fluid flow and pressure of the nitrogen gas 36. The gettering system 138 also includes an outgoing fluid line 162 connected to the plenum 150 near a top thereof and a bypass fluid line 163 interconnecting the incoming fluid line 156 and the outgoing fluid line 162. The outgoing fluid line 162 may include a valve 164 and at least one pressure indicator and/or sampling port 166 for regulating fluid flow and pressure of purified nitrogen gas 136a. The incoming fluid line 156 may include a valve 168 for regulating fluid flow of the nitrogen gas 36 directly from the tank 154 to the CAB furnace 34.

In operation of the gettering system 138, incoming nitrogen gas 36 travels from the tank 154 through the incoming fluid line 156. The incoming nitrogen gas 36 from the incoming fluid line 156 travels into the bottom of the plenum 150 and traverses radially through the baskets 152 as it is purified by the active metal getter source 140, reducing oxygen. The purified nitrogen gas 136a is pumped from the plenum 150 by a pump (not shown) to flow through the outlet fluid line 162 to the CAB furnace 34.

Figure 5:
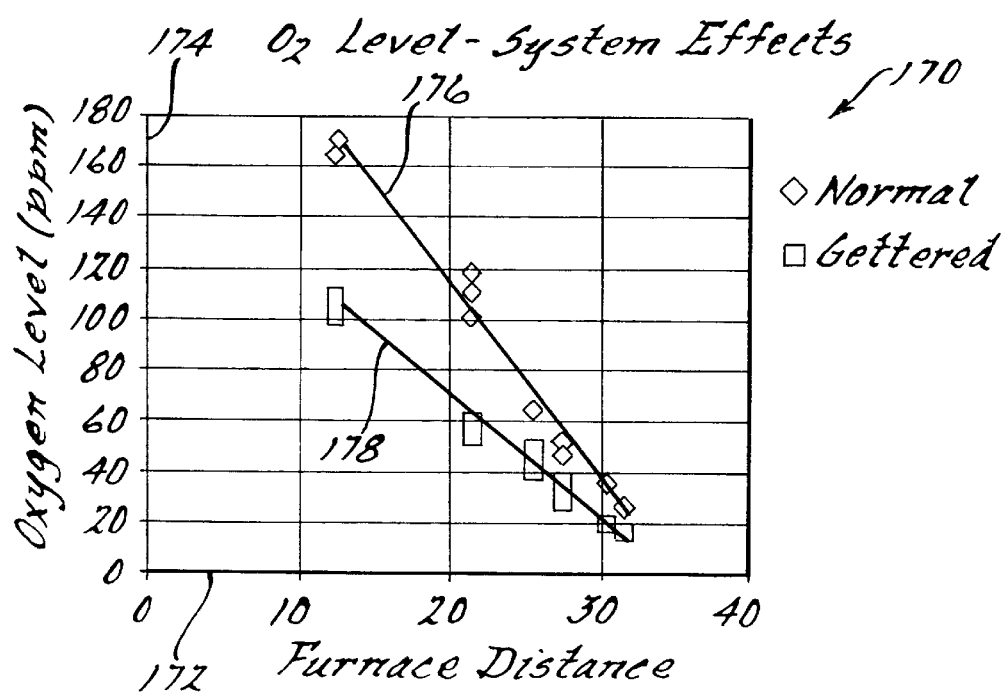
FIG. 5 is a graph of oxygen levels in a CAB furnace with and without the gettering system of FIGS. 1 through 4.

Referring to FIG. 5, a graph 170 of $O_2$ level for the CAB furnace 34 is shown for with and without the gettering system 38,138. The graph 170 has an x-axis 172 of furnace distance in inches versus a y-axis 174 of oxygen level in parts per million (ppm). The graph 170 has a first line 176 for normal or without getting system of oxygen level versus CAB furnace distance and a second line 178 for the gettering system 38,138 of oxygen level versus CAB furnace distance. As illustrated, the second line 178 is lower than the first line 176 and represents the effects of the gettering system 38,138 on atmosphere purity measured through the CAB furnace 34.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A gettering system for a CAB furnace comprising:
a nitrogen gas source to supply a nitrogen gas to a controlled atmosphere brazing (CAB) furnace;
an active metal getter source disposed within the CAB furnace and being a solid sheet to remove oxygen and water vapor in the nitrogen gas, whereby heat exchangers are brazed during a controlled atmosphere brazing (CAB) process in the CAB furnace.

2. A gettering system for a CAB furnace comprising:
a nitrogen gas source to supply a nitrogen gas to a controlled atmosphere brazing furnace;
an active metal getter source disposed outside the CAB furnace and interacting with the nitrogen gas to remove oxygen and water vapor in the nitrogen gas, whereby heat exchangers are brazed during a controlled atmosphere brazing (CAB) process in the CAB furnace;

a plenum, wherein said active metal getter source is disposed in said plenum;

a plurality of baskets stacked axially in said plenum to hold said active metal getter source; and an outgoing fluid line interconnecting said plenum and the CAB furnace to allow purified nitrogen gas to flow to the CAB furnace.

3. A gettering system as set forth in claim 2 including an incoming fluid line interconnecting said nitrogen gas source and said plenum and an outgoing fluid line interconnecting said plenum and the CAB furnace.

4. A gettering system as set forth in claim 2 wherein said active metal getter source comprises a plurality of pellets.

5. A gettering system as set forth in claim 4 wherein said pellets are made from at least one of a group comprising grit blasted titanium, molybdenum, or tantalum.

6. A gettering system as set forth in claim 4 wherein said baskets are removable from said plenum.

7. A CAB furnace comprising:

a conveyor;

a braze holding furnace fixture disposed on said conveyor for holding at least one heat exchanger, a nitrogen gas source to supply a nitrogen gas to said CAB furnace; and an active metal getter source disposed within said CAB furnace and being a solid sheet to remove oxygen and water vapor in the nitrogen gas, whereby heat exchangers are brazed during a controlled atmosphere brazing (CAB) process in said CAB furnace.

8. A CAB furnace comprising:

a conveyor;

a braze holding furnace fixture disposed on said conveyor for holding at least one heat exchanger;

a nitrogen gas source to supply a nitrogen gas to said CAB;

an active metal getter source disposed outside said CAB furnace and interacting with the nitrogen gas to remove oxygen and water vapor in the nitrogen gas, whereby heat exchangers are brazed during a controlled atmosphere brazing (CAB) process in said CAB furnace;

a plenum, wherein said active metal getter source is disposed in said plenum;

a plurality of baskets stacked axially in said plenum to hold said active metal getter source; and an outgoing fluid line interconnecting said plenum and the CAB furnace to allow purified nitrogen gas to flow to the CAB furnace.

9. A CAB furnace as set forth in claim 8 including an incoming fluid line interconnecting said nitrogen gas source and said plenum and an outgoing fluid line interconnecting said plenum and the CAB furnace.

10. A CAB furnace as set forth in claim 8 wherein said active metal getter source comprises a plurality of pellets.

11. A CAB furnace as set forth in claim 10 wherein said pellets are made from at least one of a group comprising grit blasted titanium, molybdenum, or tantalum.

12. A CAB furnace as set forth in claim 8 wherein said baskets are removable from said plenum.

* * * * *